United States Patent
George et al.

(10) Patent No.: US 10,395,124 B2
(45) Date of Patent: Aug. 27, 2019

(54) THERMAL IMAGE OCCUPANT DETECTION

(71) Applicants: Sajin George, Somerville, MA (US); Anant Aggarwal, Waltham, MA (US); Yang Li, Georgetown, MA (US); Christian Breuer, North Rhine-Westphalia (DE)

(72) Inventors: Sajin George, Somerville, MA (US); Anant Aggarwal, Waltham, MA (US); Yang Li, Georgetown, MA (US); Christian Breuer, North Rhine-Westphalia (DE)

(73) Assignee: OSRAM SYLVANIA Inc., Wilmington, MA (US)

( * ) Notice: Subject to any disclaimer, the term of this patent is extended or adjusted under 35 U.S.C. 154(b) by 124 days.

(21) Appl. No.: 15/475,437

(22) Filed: Mar. 31, 2017

(65) Prior Publication Data

US 2018/0285650 A1 Oct. 4, 2018

(51) Int. Cl.
*G06T 7/00* (2017.01)
*G06K 9/00* (2006.01)
*G06K 9/46* (2006.01)
*G06T 7/254* (2017.01)

(52) U.S. Cl.
CPC ....... *G06K 9/00771* (2013.01); *G06K 9/4642* (2013.01); *G06T 7/254* (2017.01); *G06T 2207/10048* (2013.01)

(58) Field of Classification Search
None
See application file for complete search history.

(56) References Cited

U.S. PATENT DOCUMENTS

| 2006/0242186 | A1  | 10/2006 | Hurley |
| 2015/0130933 | A1* | 5/2015  | Breuer ................ H04N 5/33 348/143 |
| 2016/0116343 | A1  | 4/2016  | Dixon et al. |
| 2016/0338177 | A1* | 11/2016 | Kikuchi ............. H05B 37/0227 |

OTHER PUBLICATIONS

Gade, Rikke et al., "Long-Term Occupancy Analysis Using Graph-Based Optimisation in Thermal Imagery," IEEE Computer Society Conference on Computer Vision and Pattern Recognition, IEEE Computer Society, US, Jun. 23, 2013, pp. 3698-3705.
Luca, Mihai Bogdan, International Search Report and Written Opinion of the International Searching Authority, for counterpart application PCT/US2018/019394, dated Apr. 19, 2018, European Patent Office, Rijswijk, The Netherlands, 12 pages.

* cited by examiner

*Primary Examiner* — Christopher G Findley
(74) *Attorney, Agent, or Firm* — Yutian Ling (57) ABSTRACT

Techniques are disclosed for detecting changes in occupancy as well as the number of occupants within an area. Detection of one or more occupants entering or leaving the area may be accomplished using a sensor having a quantity of pixels. The pixels may be configured to receive thermal energy emitted from one or more objects present in the area, including from one or more occupants. In response to receiving the emitted thermal energy, the sensor may be configured to create thermal images of the area. These thermal images may include a plurality of thermal intensity values associated with one or more pixels of the sensor. Two or more thermal images can be compared to identify a change in thermal intensity values. A change in the occupancy of the area may be determined by based on the identified change in thermal intensity values.

17 Claims, 8 Drawing Sheets

THERMAL IMAGE OCCUPANT DETECTION

TECHNICAL FIELD

The present disclosure relates to presence detection techniques, and more specifically to occupancy detection systems for detecting human presence and determining a number of occupants using thermal images.

BACKGROUND

Occupancy detection systems are commonly used to identify the presence of a human occupant, within an area. These systems use a sensor, such as an infrared (IR) or an acoustic sensor, to identify the presence of an occupant using temperature or reflected acoustic signal patterns. By monitoring the signal as a function of time, the sensor determines whether the area is occupied or not.

The figures depict various embodiments of the present disclosure for purposes of illustration only. Numerous variations, configurations, and other embodiments will be apparent from the following detailed discussion.

DETAILED DESCRIPTION

Techniques are disclosed for detecting the presence of occupants within an area, as well as, determining the number occupants within that area. This detection and determination is accomplished using a sensor having a quantity of pixels. The pixels are configured to receive thermal energy, such as infrared radiation, emitted by occupants present in the area. In response to receiving the emitted thermal energy, the sensor creates thermal images of the area using a plurality of thermal intensity values, each of which is associated with a pixel of the sensor. The presence and number of occupants in the area may be determined using statistical analysis techniques to compare the thermal intensity values for two or more thermal images. Numerous lighting applications and embodiments will be apparent in light of this disclosure.

Overview

Occupancy detection systems may include a number of sensors to identify the presence of one or more occupants within an area. The sensors may be passive infrared (PIR), acoustic or combinations thereof. These sensors, however, are prone to errors for a variety of reasons. An error may occur, for example, when two people enter an area, but a PIR sensor used to detect occupancy based on temperature alone cannot distinguish between the two people because they are approximately the same temperature (~98.6° F.). Another error occurs when one person leaves the field of view of the sensor and the sensor does not identify a change in the occupancy of the area because it continues to detect a constant temperature (~98.6° F.) from the remaining occupant. Occupancy detection systems using acoustic sensors are prone to different errors than those using thermal sensors. In more detail, acoustic sensors function by continuously sending acoustic signals within their field of view that are reflected back to the sensor by objects within the area. The sensor can determine the presence of an occupant within an area by identifying changes in the reflected signal pattern, such as when an occupant moves through the field of view of the sensor. Errors may occur when an occupant remains stationary for a period of time because the reflected signal pattern is static despite an occupant being present, but stationary, in the area.

Techniques are provided herein for determining human presence and a number of humans (referred to generically herein as "occupancy detection") present in a given area using one or more infrared (IR) sensors located in the area, regardless of whether or not an occupant is moving within the area. The one or more sensors create thermal images of the area. As will be appreciated, the images effectively capture any thermal energy being emitted from the area, including any human occupants or other heat-emitting objects. These thermal images include a number of thermal intensity values corresponding to individual pixels of the sensor(s). Because thermal intensity values may differ between thermal images in response to thermal changes in the area, such as when an occupant enters or leaves the area, the thermal images can be compared to one another to determine a change in thermal intensity values. Such changes in thermal intensity values from one thermal image to another can be used to detect occupancy (including both the presence of an occupant and a number of occupants) for the area. For instance, to determine occupancy according to an embodiment of the present disclosure, the inter-image change in the thermal intensity values is compared with a level of expected thermal intensity change for an occupant. When the identified change in the thermal intensity values is sufficiently equal to or a multiple of this level of expected thermal intensity change, a change in occupancy of the area is detected, according to an embodiment of the present disclosure. Such expected thermal intensity changes based on changes in occupancy can be determined, for example, empirically based on various actual use cases for a given area, or theoretically based on a more general understanding of thermal intensity values corresponding to a human for a given sensor. Note that expected thermal intensity changes need not be exact values. For example, a given sensor may register the thermal signature of an average size human body to be in a given range of thermal energy units, or otherwise within a suitable tolerance of an average thermal heat signature. In any such cases, the entrance and exit of occupants, including the number of occupants can be readily determined. For instance, if the thermal signature of an average size human body causes a thermal intensity of X, and the change in thermal intensity from one thermal image frame to the next is in the range of X+/−20%, then a determination can be made that a human has entered the room. If in a subsequent frame, the thermal intensity changes from X+/−20% to 2(X+/−20%) or otherwise effectively doubles in value, then a determination can be made that a second human has entered the room. And so on. If a subsequent thermal image frame shows a change in thermal intensity from about 2X to some level below X+/−20%, then a determination can be made that all people have left the room. In some embodiments, the thermal intensity of any one frame can be computed, for instance, by adding the pixel intensity values of that frame (or some other statistically relevant mathematical operation that reflects the overall intensity value of a given frame). When another occupant enters the room, more pixels detect/receive a thermal signal, which in turn produces a frame having a correspondingly greater overall thermal intensity value. Numerous such scenarios will be apparent.

Changes in thermal intensity values, however, may occur for number reasons besides an occupant entering or leaving the area. To avoid errors, the identified change in thermal intensity values may also be evaluated based a rate of change in some embodiments. When an occupant enters an area, the one or more pixels of the sensor detect more thermal energy over a relatively short period of time. This period of time may be identified as an occupant threshold. Changes in thermal intensity values occurring at a rate lower than the occupant threshold indicate non-occupant activity. Rates of change occurring at or above the occupant threshold indicate occupant activity. Based on this, occupant detection and counting for the area are performed by the system, according to an embodiment of the present disclosure.

Example Lighting Application

Figure 1A:
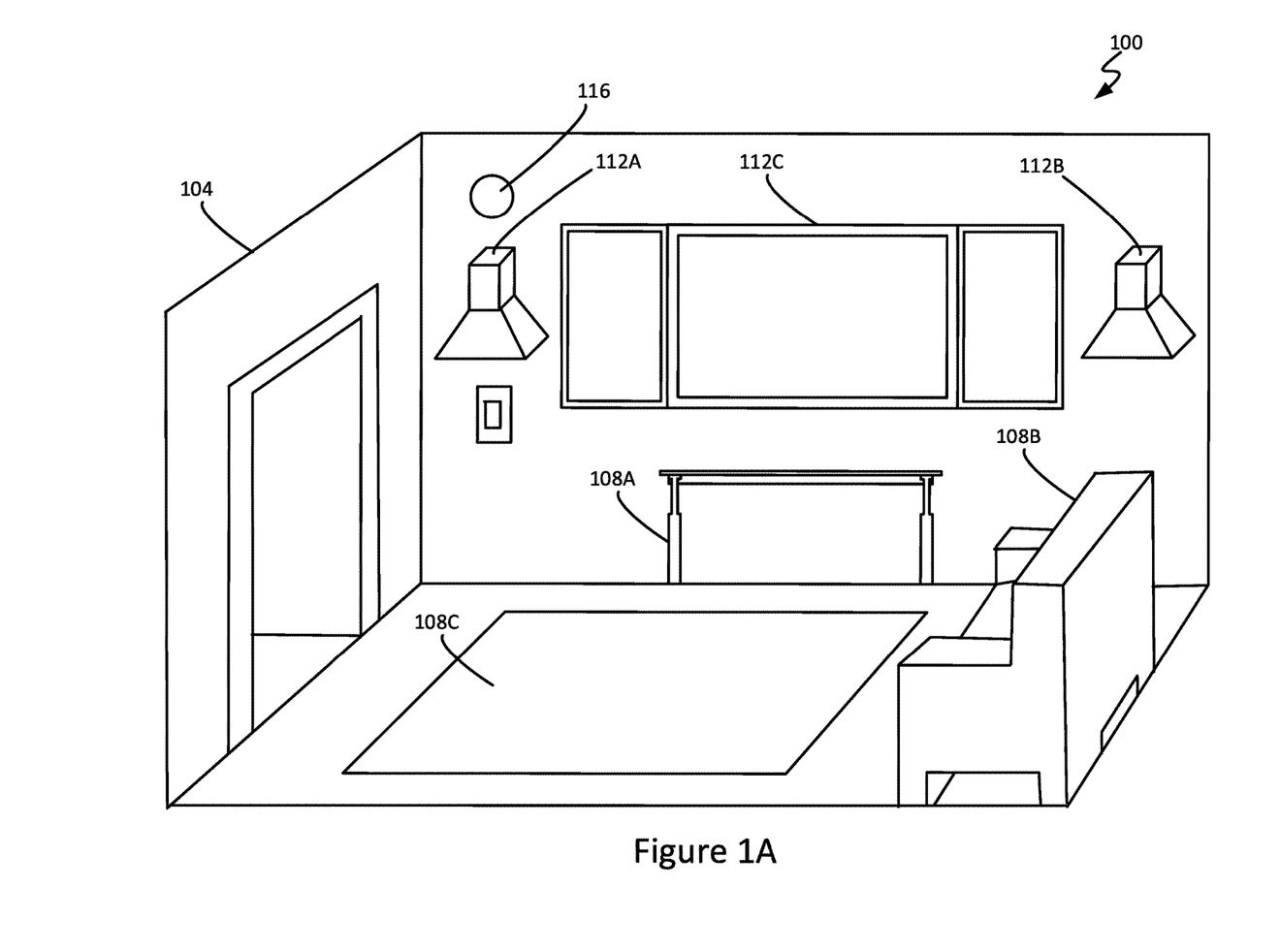
FIG. 1A illustrates an example perspective view of an area that includes a sensor for receiving thermal energy from objects within the area, in accordance with an embodiment of the present disclosure.

FIG. 1A is a perspective view of an area 100, which can be any structure or spatial environment in which human occupancy (i.e., presence and number of occupants) may be monitored using the techniques described herein. As can be seen, the area 100 may be a physical structure, such as a room with four walls 104. In other cases, however, the area 100 may be a particular space, such as, the field of view of a sensor.

The area 100 may include various furnishings (in this example, a table 108A, a couch 108B, and a rug 108C) hereinafter collectively referred to as objects 108. The objects 108 can emit thermal energy, such infrared radiation, as a function of their respective temperatures, thus contributing to the thermal activity of the area 100 in addition to that from occupants.

The thermal characteristics of the area 100 may change over time due to local thermal energy sources. Sun light, activating electrical lights, or activating electrical appliances may affect the amount of thermal energy emitted within the area 100. Examples of these local thermal energy sources shown in FIG. 1 include light fixtures 112A and 112B and a window 112C (collectively sources 112). While these sources 112 do emit thermal energy, they do so intermittently and generally over longer time periods than the entrance or exit of a human occupant.

The area 100 may include a sensor 116. The sensor 116 may be configured to receive the thermal energy emitted from the objects 108 and sources 112, and in response generate electrical signals to create thermal images. The sensor 116 may also be configured to detect thermal energy for the purpose of determining occupancy of the area 100 (as described below). The sensor 116 may be configured, such that, the field of view of the sensor can monitor the desired area with a number of pixels that is sufficient to accurately detect thermal energy changes within the area 100. In one example, the sensor 116 may be a thermopile sensor with an 8×8 array of pixels.

In some cases, the area 100 may include more than one sensor 116. Additional sensors 116 may be preferred for a number of reasons. For example, two or more sensors 116 may more accurately detect changes in thermal energy for the area 100 because multiple sensors 116 increase the number of pixels available to receive thermal energy. In other instances, additional sensors 116 may enable the entire area 100 to be measured, where a field of view for a single sensor 116 could not cover the entire area 100. Such a case may occur, for example, where the area 100 includes interior walls that define spaces within the area 100, such as, hallways, conference rooms, and office spaces that limit the field of view of a particular sensor.

Figure 1B:
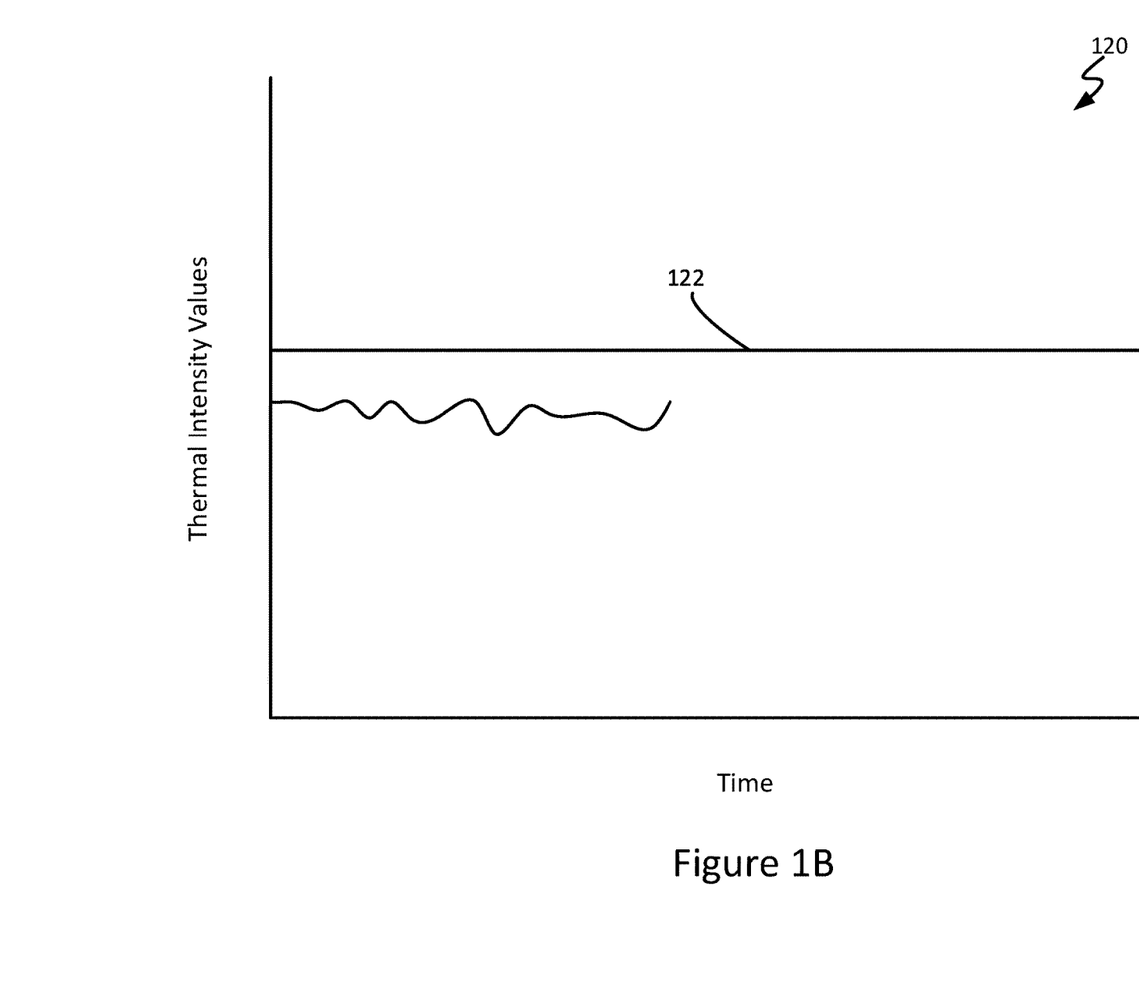
FIG. 1B is an example graphical map of the thermal intensity values from a plurality of thermal images for one or more pixels of the sensor, in accordance with an embodiment of the present disclosure.

FIG. 1B is a graphical map 120 of the thermal intensity values for a plurality of thermal images that are associated with one or more pixels of the sensor 116 for the area 100, in accordance with an embodiment of the present disclosure. The graphical map 120 illustrates thermal intensity values as a function of time. These maps can show thermal intensity values on a per pixel basis or as an average across an entire sensor 116 (as will be described). As can be seen, thermal intensity values change over time in response to pixels detecting more or less thermal energy from the area 100.

In this example case, the graphical map 120 illustrates the thermal intensity values for a period of time prior to an occupant entering the area 100. Here, because the thermal intensity values are below a level of expected change 122 corresponding to an occupant, the graphical map 120 indicates that no occupants are detected within the area 100 and thus, no occupants are present. As can be seen, the thermal intensity values illustrated in the graphical map 120 are relatively consistent, with some slight variations. These slight variations may be caused by objects and local thermal energy sources, as previously described.

Figure 1C:
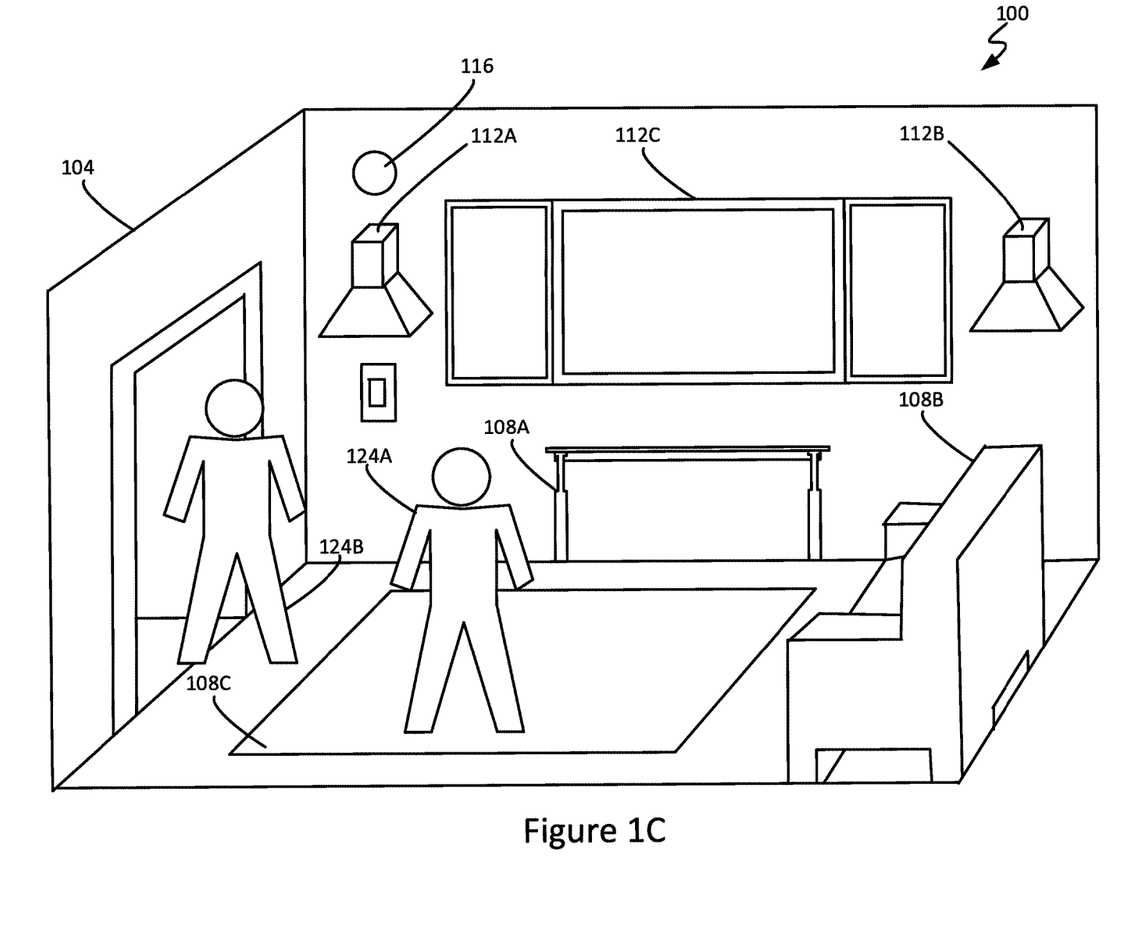
FIG. 1C illustrates an example perspective view of an area including two occupants, in accordance with an embodiment of the present disclosure.

FIG. 1C is a perspective view of an area 100 including two occupants 124A and 124B, hereinafter referred to collectively as occupants 124, in accordance with an embodiment of the present disclosure. As can be seen, the two occupants 124 have entered the area 100 and thus are also within a field of view (FOV) of the sensor 116.

Figure 1D:
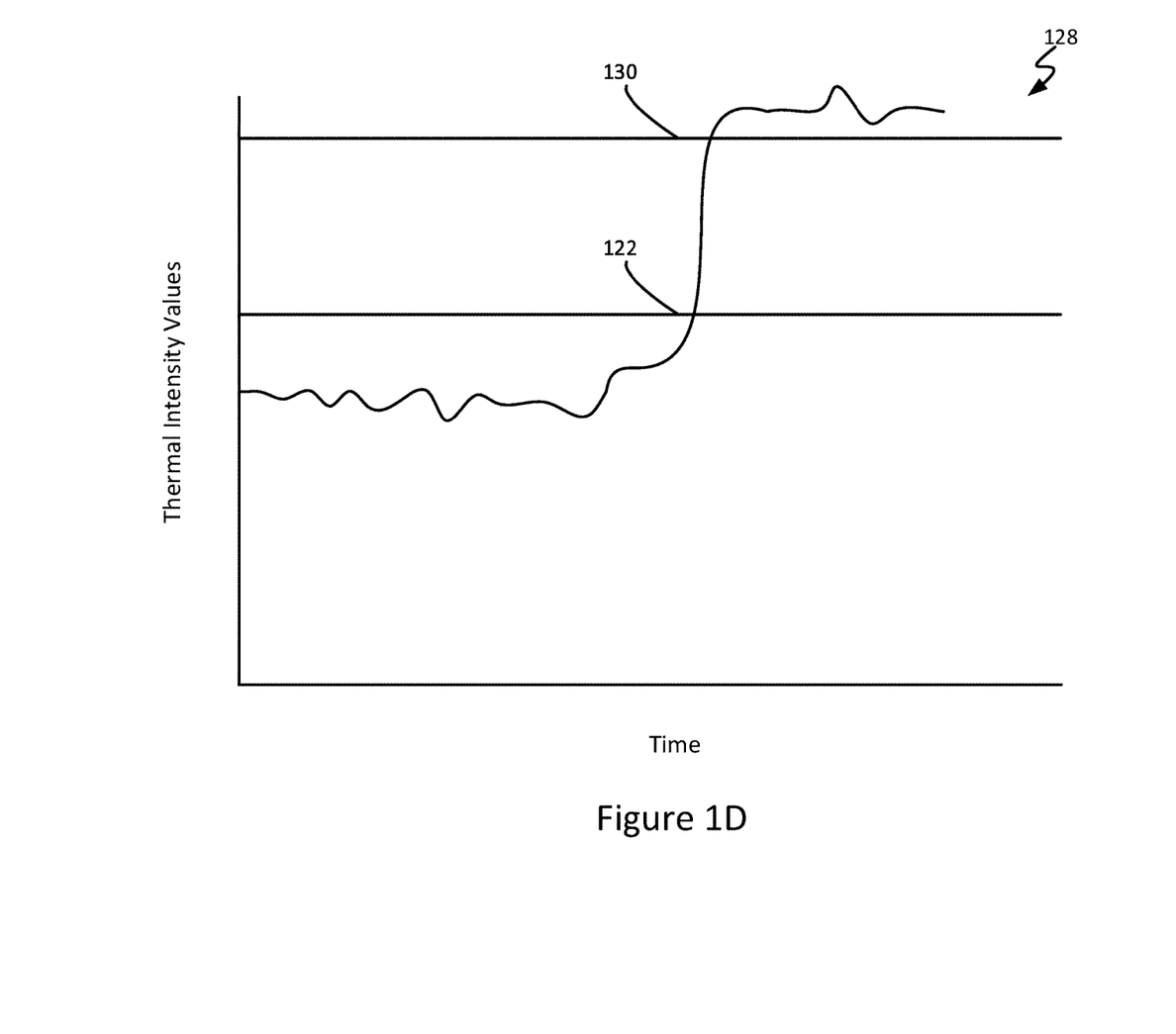
FIG. 1D is an example graphical map of the thermal intensity values illustrating a change in thermal intensity values in response to two occupants entering the area, in accordance with an embodiment of the present disclosure.

Analogous to FIG. 1B, FIG. 1D is a graphical map 128 illustrating a change in thermal intensity values in response to two occupants 124 entering the area 100, as illustrated in FIG. 1C. As can be seen, the graphical map 128 illustrates a positive change in thermal intensity values greater than the level of expected change 122 in response to the occupants 124 entering the area 100. The change in thermal intensity values is a positive change because when an occupant 124 enters the area 100 the amount of thermal energy emitted in the area 100 (as detected by the sensors 116) increases. An increase in the thermal intensity values can indicate a change in occupancy based on the amount of change (i.e., magnitude) and the time in which the change occurs (i.e., rate of change).

The magnitude of the thermal intensity value change for an occupant 124 may be equal to or above the level of expected change 122. Occupants 124 are associated with a certain temperature band (generally 98.6° F.) in which they emit thermal energy. This temperature band, however, may be reduced due to the clothing worn by the occupants 124, which reduces thermal energy emission from an occupant 124 (compared to bare skin). Clothing may provide a barrier between the skin of the occupant 124 and the sensor 116 reducing the amount thermal energy received by the sensor 116. Heavy clothing, such as coats or jackets, may inhibit the transmission of thermal energy from the occupant 124 to the sensor 116 because these clothing articles are made from dense materials designed to retain thermal energy to keep the wearer warm. Lighter clothing, for instance tee-shirts and shorts, on the other hand, permit greater emission of thermal energy, because these clothing articles either expose more skin and/or are manufactured from less dense materials to promote transmission of thermal energy and thus, allow the wearer to be cool and comfortable.

Other factors, such as seasonal temperatures, along with an occupant's clothing may further reduce or increase the difference in thermal energy emitted from an occupant 124 and the surrounding area 100. For instance, when the temperature of the area 100 is high (e.g., 85° F. during the summer months) the difference in thermal energy detected between the area 100 and an occupant 124 is smaller because the temperature values of the occupant and the area are similar to one another. Lighter clothing worn by the occupant 124 during periods of high temperatures, also permits transmission of more thermal energy to be received by the sensor 116, which in turn causes the sensor 116 to generate higher thermal intensity values. Thus, the detected difference is relatively low, for example, as little as 2° F. In other instances, however, when the area 100 is at a temperature below that of an occupant 124 (e.g., 60° F. during the fall and winter months), the detected difference in thermal energy between the occupant 124 and the area 100 is higher because the temperature values of the occupant 124 and the area 100 are not similar to one another. For example, the system may detect thermal energy corresponding to a difference in temperature of 10° F. or more from the exposed portions of the occupant 124 (e.g., hands and face) or while wearing lighter clothing from the body of the occupant 124. Heavier clothing, however, may inhibit emission of thermal energy from the occupant 124 and reduce this corresponding temperature difference, as previously described. Thus, changes in thermal intensity values ranging in magnitude from 2° F. to 10° F. or more may indicate that one or more occupants 124 have entered or left the area 100.

Determining occupancy (i.e., occupant presence detection and count) also includes evaluating whether the change occurs at a rate associated with an occupant 124. As can be seen, the change in thermal intensity values in response to an occupant 124 entering the area 100 may occur over a short period of time, for example a few seconds. In contrast, objects 108 may experience changes in temperature over a period of one, two, or several hours. As can be seen from the graphical map 128, the change in thermal intensity values is greater than the level of expected change 122 and occurs in a very short period of time. In response, the system detects a human presence in the area 100, by determining that at least one person has entered the area 100.

In this instance, however, the graphical map 128 further illustrates that the thermal intensity values are above a first multiple 130 of the level of expected change 122. The first multiple 130, in some examples, may be an integer multiple of the level of expected change 122. In other instances, however, the first multiple 130 is based on thermal characteristics of the area 100 (e.g., the thermal energy emitted from objects) and the level of expected change 122. Based on the thermal intensity value being at or above the first multiple 130, the system is further configured to determine the number of occupants 124 present in the area 100 (i.e., the occupant count) to be two occupants 124.

Figure 1E:
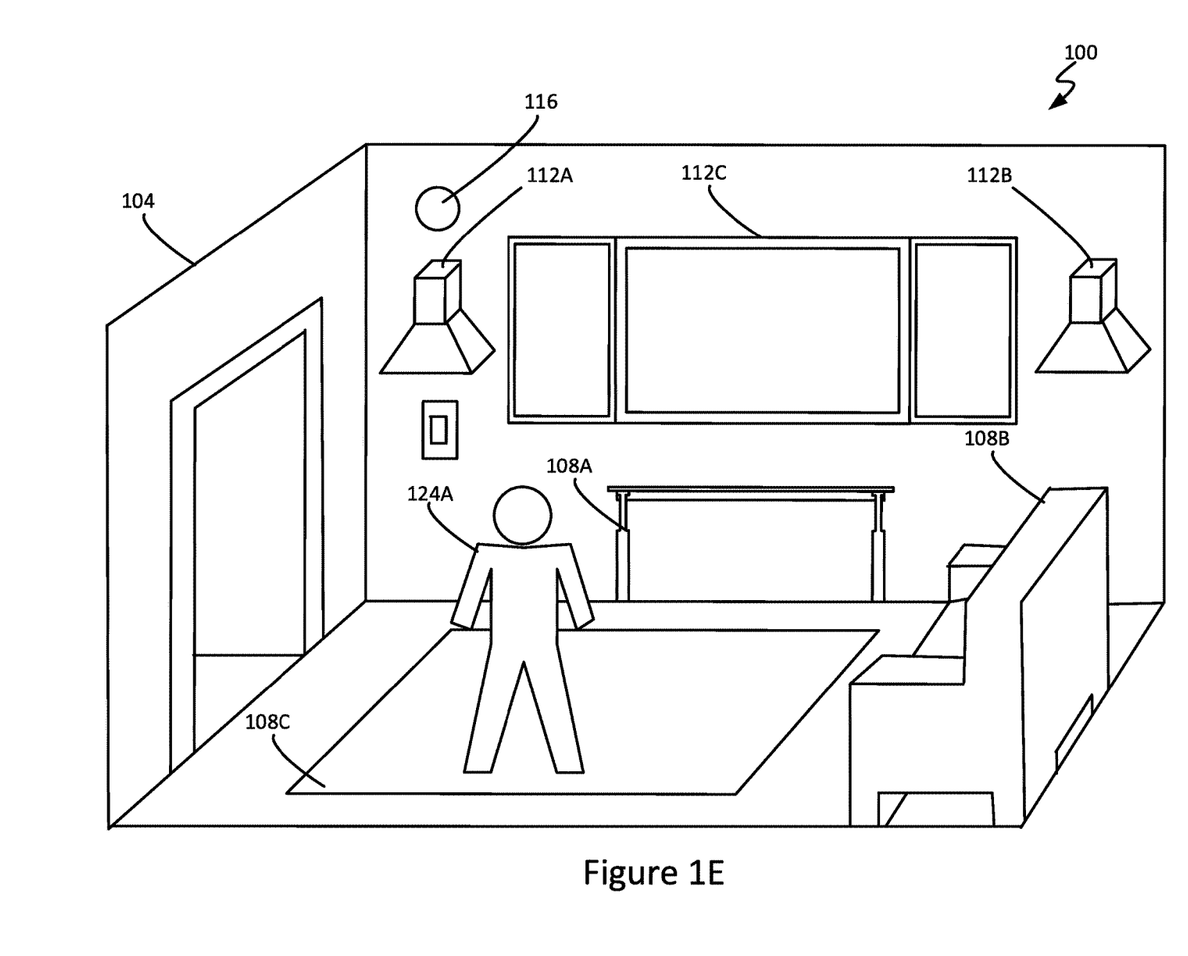
FIG. 1E illustrates an example perspective view of an area where one occupant has left the area and one occupant remains in the area, in accordance with an embodiment of the present disclosure.

FIG. 1E is a perspective view of area 100 where one occupant 124B has left the area 100 and one occupant 124A remains in the area 100, in accordance with an embodiment of the present disclosure. As can be seen, occupant 124B has left the FOV of the sensor 116 and now the sensor 116 can no longer measure the thermal energy emitted from occupant 124B. In response, the magnitude of the thermal intensity values for the subsequent thermal images is reduced.

Figure 1F:
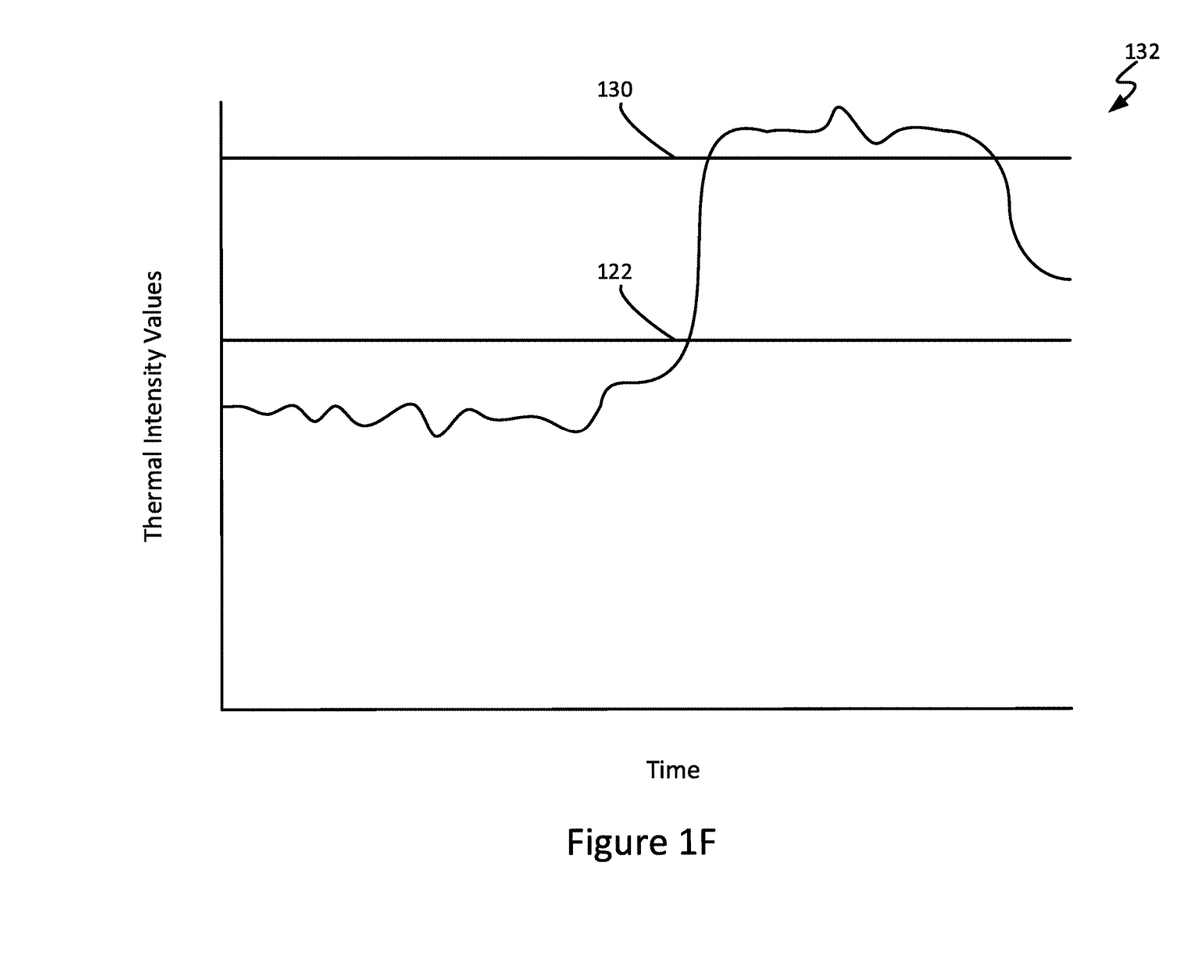
FIG. 1F is an example graphical map of the thermal intensity values illustrating a change in thermal intensity values in response to one occupant leaving the area and one occupant remaining in the area, in accordance with an embodiment of the present disclosure.

FIG. 1F is a graphical map 132 illustrating a change in thermal intensity values in response to one occupant 124B leaving and one occupant 124A remaining in the area 100, in accordance with an embodiment of the present disclosure. When an occupant 124 leaves the area 100 a negative change in thermal intensity values occurs over a relatively short amount of time because the amount of thermal energy emitted within the area 100 has been reduced. This is in contrast to the pattern exhibited when a one or more occupants 124 enter the FOV of the sensor 116 and thus increase thermal energy emitted within the area 100, as shown in FIG. 1D. In this instance, the thermal intensity values are now below the first multiple 130. The thermal intensity values, however, are above the level of expected change 122 indicating that an occupant 124 is present in the area 100. Thus, the system can determine that occupant 124B has left the area 100, while occupant 124A remains in the FOV of the sensor 116 (i.e., sensor detects the presence of occupant 124A) based on changes in the thermal intensity values over time. In this instance, the system is detecting the presence of occupant 124A and in response, the occupant count is adjusted from two occupants 124 to one occupant 124 based on the change in thermal intensity values.

System Architecture

Figure 2:
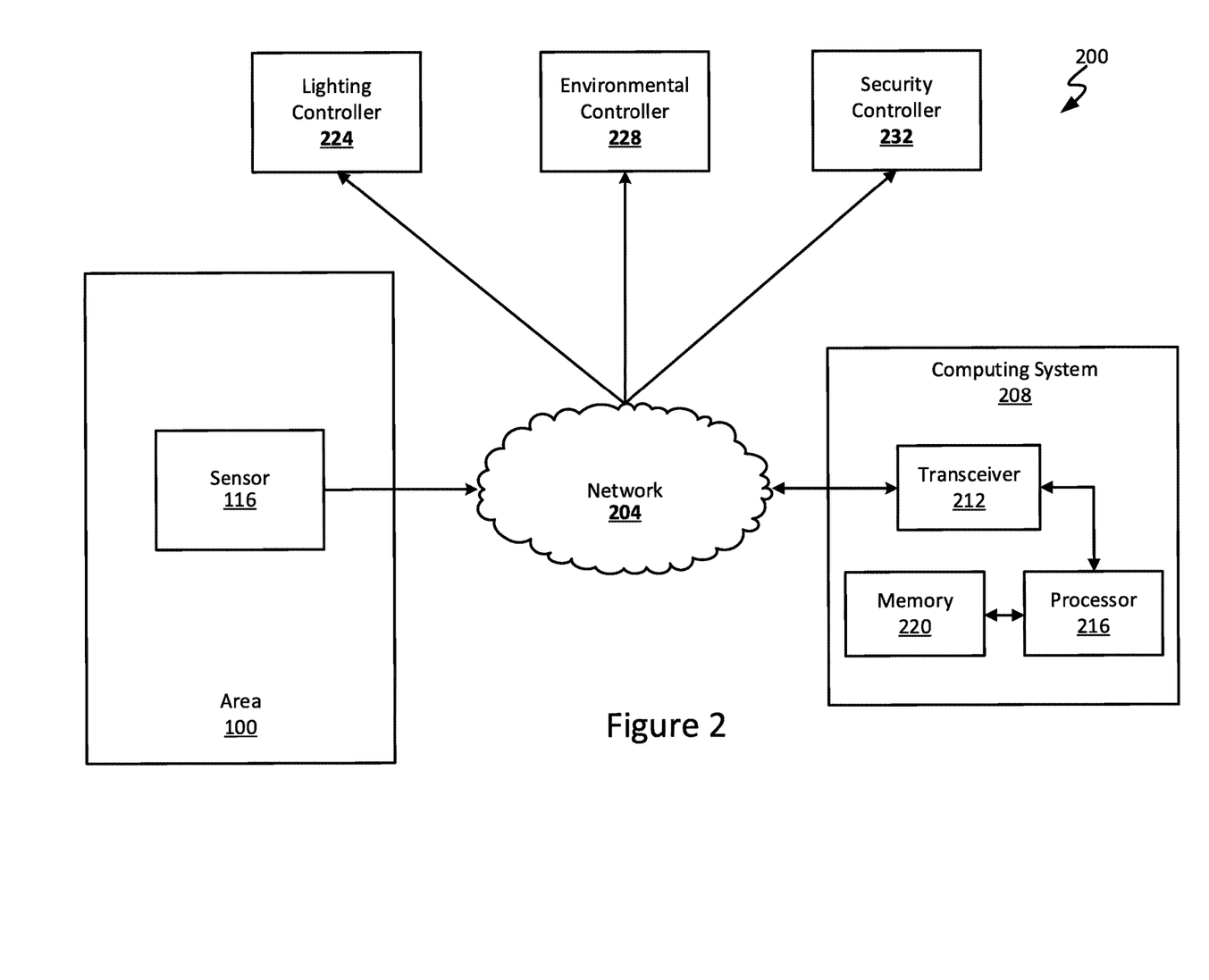
FIG. 2 is a block diagram of a system for detecting the occupancy of the area, in accordance with an embodiment of the present disclosure.

FIG. 2 is a block diagram of a system 200 configured for determining the occupancy for the area 100, in accordance with an embodiment of the present disclosure. The system 200 may include an area 100, network 204, computing system 208, lighting controller 224, environmental controller 228, and security controller 232. The area 100 may include one or more sensors 116 (as previously described). The sensor 116 may be in communication with the computing system 208 via the network 204.

As can be seen, the occupancy detection system 200 may allow for communicative coupling between the network 204 and one or more servers or other computing systems 208. The network 204 may also place in communication the sensors 116 and/or the computing system 208 with one or more controllers, such as, lighting controller 224, environmental controller 228, and security controller 232 (as will be described). The network 204 may be a wireless local area network, a wired local network, or a combination of local wired and wireless networks, and may further include access to a wide area network such as the Internet or a campus-wide network. In a more general sense, network 204 can be any communications network.

The computing system 208 may be any suitable computing system capable of communicating over a network 204, such as a cloud-based or campus-based server computer, and may be programmed or otherwise configured to provide an occupancy detection related service, according to some embodiments. For example, in an occupancy detection related service the computing system 208 may be configured to receive pixel temperature data generated in response to receiving thermal energy from the area 100. Numerous other such configurations will be apparent in light of this disclosure.

The computing system 208 may further include or otherwise be operatively coupled to a transceiver 212 that receives and transmits communication signals to facilitate the exchange of information between the computing system 208 and other devices of the occupancy detection system 200. Transceiver 212, for example, may be located within or otherwise operatively coupled with the computing system 208 and configured with standard technology to facilitate communication with one or more other transceivers located inside and/or outside the area 100. In some embodiments, the transceiver 212 is a modem, or other suitable circuitry that allows for transmitting and receiving data from a network. The communication signals may contain a variety of information, for example protocol information, thermal intensity values, thermal images and/or occupancy information. Once the sensors 116 have measured and/or recorded the thermal intensity values, the sensors 116 may transmit this information to the computing system 208. The computing system 208 may receive this information via the network 204. In the example embodiment shown, the transceiver 212 may then communicate this information to one or more processors 216 of the computing system 208, which in turn are programmed or otherwise configured to compile and distribute instructions and data to the controllers 224, 228, and 232.

For example, in some embodiments, the one or more processors 216 are configured to process the received thermal intensity value data. The data created and/or managed by the processors 216 may be stored within a memory 220 to support various operations of the computing system 208. Memory 220 may be any physical device capable of non-transitory data storage, such as read only memory (ROM) and random access memory (RAM).

The memory 220 may also include a buffer. The buffer portion of the memory 220 may be a temporary holding place for data that is being sent to or received from an external device, such as, sensors 116. In some instances, for example, the thermal images may be initially stored in a buffer portion of the memory 220. Storing images in the buffer may be preferable in some instances, when the sensors 116 are continuously capturing thermal images or frames of the area 100. The buffer portion of the memory 220 may temporarily store a number of thermal images, for example, the last 10, 50, 100 or 500 of the most recent images. As a result, older thermal images may be deleted or removed from the system 200, because these images no longer accurately represent the thermal characteristics of the area prior to the change in thermal intensity values.

In some embodiments, one or more controllers may be configured to process occupancy data and then adjust or change settings of one or more devices. In this case, the computing system 208 may be in communication with a lighting controller 224, an environmental controller 228 and a security controller 232. The computing system 208 may also be in communication with additional controllers not illustrated in FIG. 2, such as audiovisual device controllers.

A lighting controller 224 is a device configured to change or modify the lighting characteristics or functions of a light fixture. Lighting characteristics, such as brightness or color temperature, may be adjusted based on the number of occupants in the area 100. Similarly, lighting functions, such as turning on or off or dimming lights, may also be adjusted based on the occupancy of the area 100. For instance, when the system 200 detects that no occupants are in the area 100, the system may be configured to command the lighting controller 224 to dim or turn off one or more light fixtures in the area 100.

In other instances, the system 200 may also transmit occupancy information to one or more environmental controllers 228. An environmental controller 228 is a device configured to change the environmental characteristics, such as heating, air conditioning, transmitting sound (i.e. music), and/or displaying natural light (i.e. adjusting position of window treatments), based on the number of occupants in the area 100. For instance, when the system 200 detects several occupants within the area 100, the system may be configured to command the environmental controller 228 to increase or decrease the temperature of the area 100.

In some other instances, the system 200 may also transmit occupancy information to one or more security controllers 232. A security controller 232 is a device configured to adjust and/or monitor changes to security characteristics or postures for the area 100, for example locking doors and windows and/or activating and deactivating security sensors. These characteristics may be adjusted based on the number of occupants in the area 100. For instance, when the system 200 detects that occupants are present in the area 100, the system 200 may be configured to command the security controller 232 to lock one or more doors and/or activate the security sensors for the area 100. No matter the particular use for the occupancy information, the system 200 may determine the occupancy of the area 100 by comparing two or more thermal images of the area using statistical analysis techniques and methods.

Numerous use cases and embodiments will be apparent in light of this disclosure. For example, the computing system 208 may be located within or adjacent to the sensors 116. In this case, the computing system 208 may be connected via a wired connection and/or circuit board. As a result, the occupancy information obtained from the sensors 116 may be transmitted directly to the computing system 208 for processing. Upon completion of processing this information, the sensors 116 may then transmit this information to the one or more controllers 224, 228, 232 via the network 204.

Determining Occupancy of an Area

Figure 3:
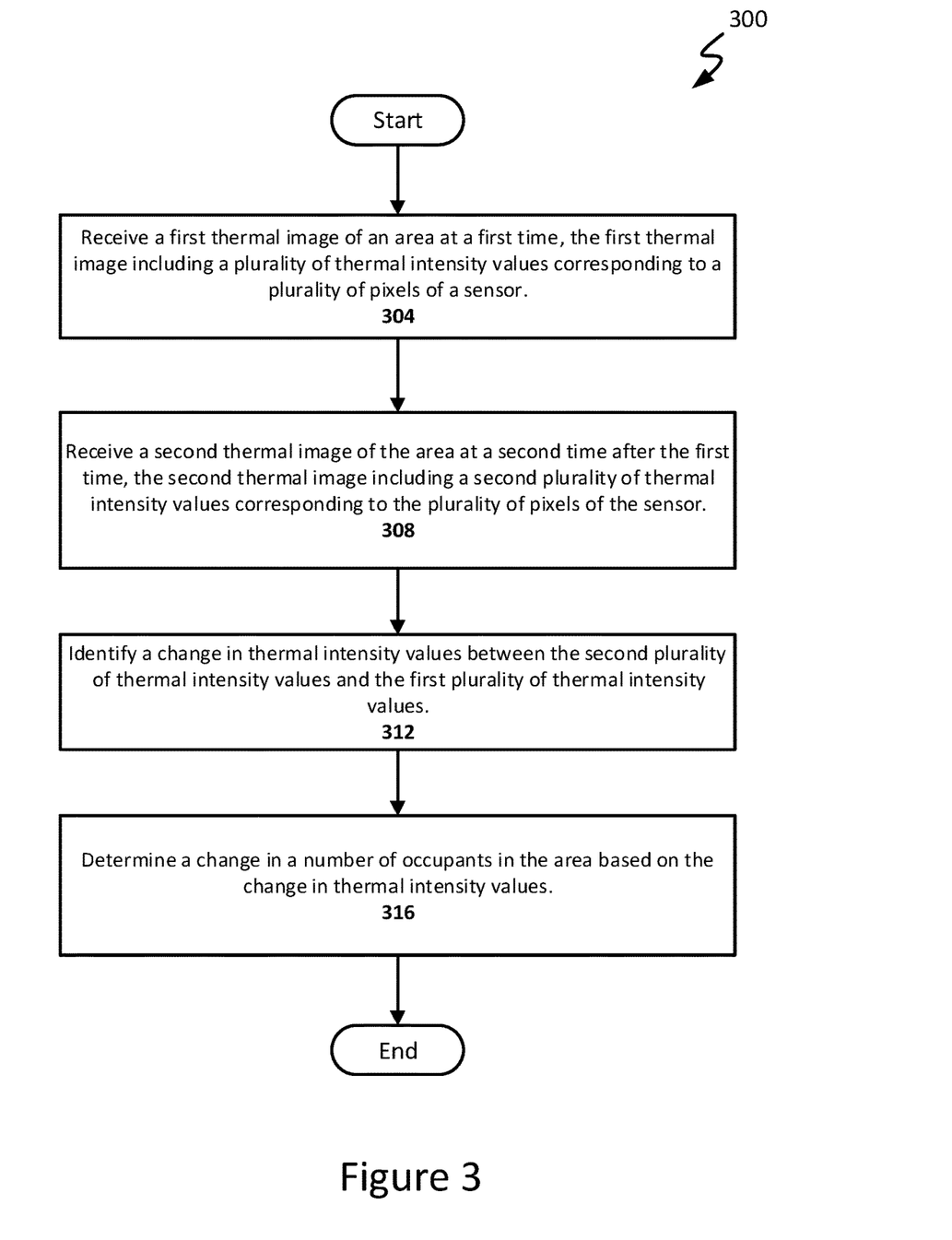
FIG. 3 is a flowchart illustrating an example method for determining the occupancy of an area, in accordance with an embodiment of the present disclosure.

FIG. 3 is a flowchart of an example method 300 for determining the occupancy of an area, in accordance with an embodiment of the present disclosure. The method 300 may be performed by the computing system 208 or any other computing systems that receive thermal imaging data from one or more sensors located in an area. The method 300 compares thermal images to identify changes in the occupancy of the area. These thermal images depict the thermal characteristics of the area using thermal intensity values. A change in the thermal intensity values (i.e., magnitude and rate of change) associated with one or more pixels of the sensor can be used to determine the occupancy (i.e., detecting human presence and a number of occupants) of the area.

As can be seen, the method 300 includes receiving a first thermal image of the area at a first time, the first thermal image including a plurality of thermal intensity values corresponding to a plurality of pixels of a sensor in block 304. A thermal image is an image of an area created in response to detecting thermal energy in the form of infrared radiation emitted or reflected from a given object(s). The thermal image may have a number of thermal intensity values associated with one or more pixels of the sensor. In some instances, the thermal image may include a plurality of thermal intensity values from two or more sensors to create a consolidated thermal image.

A first thermal image is an image of the area prior to a change in occupancy identified by a subsequent thermal image. The first thermal image may be created at any time, including just before creating the subsequent thermal image. In some cases, the first thermal image is a reference image that identifies thermal intensity values associated with an unoccupied area. In other cases, however, the reference image may be associated with a defined number of occupants. In such instance, note that the system may be configured to receive data regarding the number of occupants in the area. The number of occupants may be manually inputted into the system using human feedback. Human feedback may also allow the system to learn characteristics of the area which could be incorrectly interpreted as an occupant (as will be discussed). As a reference image, the first thermal image is compared to subsequent thermal images to determine changes in occupancy for the area.

The method 300 further includes receiving a second thermal image of the area at a second time after the first time, the second thermal image including a second plurality of thermal intensity values corresponding to the plurality of pixels of the sensor in block 308. A second thermal image identifies a potential change in occupancy for the area based on its thermal intensity values. For clarity and ease of understanding, the first thermal image and second thermal image are hereinafter collectively referred to as thermal images.

A second thermal image is an image of area created to identify a change in thermal intensity values. In a more general sense, the second thermal image may be a real time or present moment image of the area that is received after the first thermal image (e.g., from 100 milliseconds to 5 seconds after the first thermal image). In this way, the thermal images may be recorded close enough in time such that the images depict the area just prior to and at the moment of change in thermal intensity values.

The method 300 further includes identifying a change in thermal intensity values between the second plurality of thermal intensity values and the first plurality of thermal intensity values used to determine a change in occupancy for the area in block 312. A change in the thermal intensity values is identified by comparing corresponding thermal intensity values of the thermal images. One way of identifying corresponding thermal intensity values is using a pixel index. A pixel index is an index that uniquely identifies the pixels of the sensor, such that each pixel of the sensor corresponds to one thermal intensity value for each thermal image. The pixels may be uniquely identified in the pixel index using numbers, letters, words, symbols, and/or text strings. Using uniquely identified pixels, the thermal intensity values of the first thermal image and the second thermal image corresponding to the same pixel can be compared and thus used to determine occupancy. The images may also be compared to detect a stationary human presence as described in U.S. patent application Ser. No. 14/076,372, titled "Human Presence Detection Techniques," filed on Nov. 11, 2013 and herein incorporated by reference in its entirety.

Once the thermal intensity values for the first thermal image and second thermal image corresponding to a pixel are identified, a change in thermal intensity value for the corresponding pixel is determined. In some instances, the change in thermal intensity value is determined by simple subtraction, although other algorithms may also be used, such as averaging. In other instances, changes in thermal intensity values may be determined using statistical analysis techniques. In some instances, a variance in thermal intensity values is determined based on the entire image. In such an instance, a variance in thermal intensity values for the two or more images is determined by analyzing the changes in thermal intensity values using standard deviation techniques.

The method 300 further includes determining a change in a number of occupants in the area based on the change in thermal intensity values in block 316. Changes in the number of occupants and the number of occupants now in the area may be determined based on whether: (1) the magnitude of the change is equal to one or a multiple of the level of expected change and (2) the rate of change occurs at or above an occupant threshold. The computing system may track the number of occupants identified from each thermal image, and thus may track changes in the number of occupants between successive thermal images.

The magnitude of change in thermal intensity values is the difference between thermal intensity values per pixel (or frame) of the thermal images corresponding to the previously identified change in thermal intensity values and includes an associated direction of change (i.e., positive or negative). In some instances, for example, a variance threshold is used to determine whether the occupancy of the area has changed. A variance threshold is a variance value corresponding to an occupancy level for the given area (e.g., area is unoccupied). If the determined variance (as described above) is greater than the variance threshold then the system may indicate a change in occupancy (depending on a rate of change, as described below). This indicated change in occupancy, however, may occur in response to an occupant entering or leaving the area. Thus, to distinguish between when an occupant enters or leaves the area, the system is configured to determine average thermal intensity values for both the first image (i.e., the reference image) and the second image. If the average thermal intensity value for the second image is greater than the average value for the first image, then the change in occupancy is associated with an occupant entering the area. On the other hand, if the average thermal intensity value for the second image is less than the average value for the first image, then the change in occupancy of the area is associated with an occupant leaving the area.

To determine a change in the number of occupants in the area, the magnitude of change in the thermal intensity values is compared with a level of expected change in thermal intensity values for an occupant. This level may range from as little as 2° F. to 10° F. or more depending on a number of factors, as previously described. These factors may be dynamic, in some cases, and thus, cause known conditions of the area to change over time. As a result, the level of expected change may no longer correspond to thermal intensity value changes for an occupant. As a result, the level, in some embodiments, may be updated periodically or continuously in response to changes in the area (e.g., environmental conditions collected from environmental sensors and other sources of information) to ensure the level of expected change corresponds to occupant activity for identifying human presence detection and/or determining an occupant count for the area. Magnitudes of thermal intensity value changes not equal to one or a multiple of the level of expected change for an occupant indicate non-occupant activity and can be disregarded for purposes of determining occupancy. Some non-occupant activity, such as activating electronic appliances, however, may cause thermal intensity value changes with magnitudes at the level of expected change for an occupant. To distinguish between occupant activity and non-occupant activity and thus, avoid an incorrect determination of the number of occupants in the area, the rate of change for the thermal intensity values is determined.

When an occupant enters or leaves the area, the act of moving into or out of the field of view of the sensor may happen quickly, for example, within a few seconds. Thus, changes to the thermal intensity values related to occupant activity are likely to occur within a short time period. For example, the rate of change of thermal intensity values for an occupant entering or leaving the area may be set as 4° F. per second, the occupant threshold. In contrast, non-occupant activity may create thermal intensity value changes at the level of expected change for an occupant, but these changes may occur over a very long period of time, such as, several minutes or hours. Thus, occupancy of the area can be determined when the change in thermal intensity values is at least one or a multiple of the level of expected change for an occupant and occurs at a rate equal to or above the occupant threshold.

Improving Occupancy Detection Accuracy & Efficiency

For some areas there may be a number of causes for the changes in the thermal intensity values of the thermal images. These additional causes of change may adversely affect the accuracy and/or precision of the system and thus affect the accuracy of the occupancy determination. To avoid these potential errors, the system may participate in supervised machine learning to receive additional information regarding the activity in the area so as to better distinguish between occupant activity (e.g. entering or leaving the area) and non-occupant activity. In some examples, a pixel mask may be used to modify or adjust one or more thermal intensity values of a thermal image. In such an instance, a pixel mask may modify the thermal intensity values associated with non-occupant activity to be zero or equal to an equivalent background value. In some instances, the reference image is corrected using a pixel mask. In other instances, however, the second thermal image or both images may be corrected using a pixel mask. With the thermal intensity values corrected, the images may be compared to determine a change in occupancy with a less likelihood of an error due to non-occupant activity.

In some embodiments, the system may be configured to variously monitor the area for subsequent changes in thermal intensity values. One way to monitor the area, for example, may be to continuously compare the thermal images, for instance, at intervals of every quarter of a second, half a second or a second. In other instances, however, the comparison of thermal images may occur more infrequently for periods of less occupant activity, for example, from mid-night to 4 a.m. In some other instances, the comparison of thermal images may be dynamic, such that, the comparisons occur at varying intervals based on occupant activity. For example, during periods with little or no occupant activity the comparison of thermal images may be less frequent, but when occupant activity is detected the comparison of thermal images may occur with increasing frequency.

In other embodiments, the system may be configured to receive pre-programmed data regarding the area. In this instance, the furnishings within the field of view of the sensor may be known and can be disregarded for purposes of determining occupancy. For instance, the system may be programmed to disregard changes in thermal intensity values having a magnitude of "A" occurring within "B" seconds. As a result, sources of thermal change corresponding to these programmed values are identified as non-occupant related activity (e.g., activating a light fixture) and are removed from the thermal image. Thus, the system may be configured to be programmed with or learn area conditions and in turn automatically distinguish between occupant and non-occupant activity (e.g., activity a light fixture) within the area. Furthermore, by pre-programming the system with the thermal characteristics of the area, system accuracy and efficiency can be improved because the system is not using resources to evaluate known sources of thermal intensity value changes.

In some other embodiments, the comparison of thermal intensity values may be accomplished once the thermal images are stored. The first and second thermal images may be continuously stored. Continuously storing the thermal images may utilize significant amount of resources to maintain this information. In addition, after a long period of time the usefulness of the data may no longer justify the expense of maintaining the thermal images. To address this problem, one method for storing the thermal images may be to permanently store thermal images when a change in thermal intensity values occurs. In this instance, the first thermal image may be initially stored in a buffer portion of the memory. As more and more thermal images are created, the less recent thermal images may be removed from the buffer to make space for the most recent thermal images. Fewer computing resources are utilized to maintain these images because there are less thermal images retained in the system at one time. In this instance, once a change in thermal intensity values is detected at or above the level of change for an occupant, then both the first and second thermal images may be saved in the permanent portion of the memory. In some embodiments, thermal images that are permanently stored in memory may also be deleted after a certain period of time, for example after 30 days, in order to free up memory.

Further Considerations

Numerous embodiments will be apparent in light of this disclosure. One example embodiment provides a method of determining the occupancy of an area, the method including receiving a first thermal image of the area collected at a first time, the first thermal image including a first plurality of thermal intensity values corresponding to a plurality of pixels of a sensor, receiving a second thermal image of the area collected at a second time after the first time, the second thermal image including a second plurality of thermal intensity values corresponding to the plurality of pixels of the sensor, identifying a change in thermal intensity values between the second plurality of thermal intensity values and the first plurality of thermal intensity values, and determining a change in a number of occupants in the area based on the change in thermal intensity values.

In some embodiments, the first thermal image may be a reference image of the area without occupants. In some embodiments, identifying the change in thermal intensity values may include storing the first thermal image and the second thermal image, identifying thermal intensity values in the first thermal image that correspond to one or more thermal intensity values in the second thermal image, and comparing the corresponding thermal intensity values between the first thermal image and the second thermal image to identify the change in thermal intensity values. In some embodiments, the change in thermal intensity values indicates there is no change in the number of occupants in the area based on at least one of the first plurality of thermal intensity values is determined to be equal to the second plurality of thermal intensity values, and the first plurality of thermal intensity values and the second plurality of thermal intensity values are less than a level of expected change in thermal intensity values corresponding to at least one of a single occupant entering the area and a single occupant leaving the area.

In some embodiments, determining a change in the number of occupants in the area may include comparing the change in thermal intensity values to a level of expected change in thermal intensity values corresponding to at least one of a single occupant entering the area and a single occupant leaving the area, determining a rate of change for the change in thermal intensity values, identifying a presence of an occupant in the area when the compared change in thermal intensity values corresponds to one or more occupants and the determined rate of change is equal or greater to an occupant threshold, and identifying the number of occupants in the area by determining a multiple of the change in thermal intensity values to the level of expected change in thermal intensity values. In some embodiments, one or more occupants have entered the area when the change in thermal intensity values is positive. In some embodiments, one or more occupants have left the area when the change in thermal intensity values is negative.

Some embodiments may further include associating the change in thermal intensity values with a non-occupant change in response to determining that the determined rate of change is less than the occupant threshold. Some embodiments may further include adjusting the first plurality of thermal intensity values of the first thermal image, the adjustment preventing an incorrect determination of a change in the number of occupants in the area. In some embodiments, the first plurality of thermal intensity values of the first thermal image are adjusted such that at least one of the first plurality of thermal intensity values are set to be equal to at least one of the second plurality of thermal intensity values of the second thermal image.

Further embodiments disclose herein include a system for detecting one or more occupants within an area, the system including a sensor disposed within the area, the sensor configured to record a first thermal image of the area at a first time, the first thermal image including a first plurality of thermal intensity values corresponding to a plurality of pixels of the sensor, and a second thermal image of the area at a second time later than the first time, the second thermal image including a second plurality of thermal intensity values corresponding to the plurality of pixels of the sensor. The system further includes a computing system in communication with the sensor, the computing system configured to receive the first thermal image and the second thermal image from the sensor, identify a change in thermal intensity values between the second plurality of thermal intensity values and the first plurality of thermal intensity values, and determine a change in a number of occupants in the area based on the change in thermal intensity values.

In some embodiments, the system may further include a network connected to the sensor and the computing system, in which the sensor is placed in communication with the computing system via the network. In some embodiments, the computing system is configured to identify the change in thermal intensity values by storing the first thermal image and the second thermal image, identifying thermal intensity values in the first thermal image that correspond to one or more thermal intensity values in the second thermal image, and comparing the corresponding thermal intensity values between the first thermal image and the second thermal image to identify the change in thermal intensity values. In some embodiments, the change in thermal intensity values indicates there is no change in the number of occupants in the area based on at least one of the first plurality of thermal intensity values is determined to be equal to the second plurality of thermal intensity values, and the first plurality of thermal intensity values and the second plurality of thermal intensity values are less than a level of expected change in thermal intensity values corresponding to at least one of a single occupant entering the area and a single occupant leaving the area.

In some embodiments, the computing system is configured to determine a change in the number of occupants in the area by comparing the change in thermal intensity values to a level of expected change in thermal intensity values corresponding to at least one of a single occupant entering the area and a single occupant leaving the area, determining a rate of change for the change in thermal intensity values, identifying a presence of an occupant in the area when the compared change in thermal intensity values corresponds to one or more occupants and the determined rate of change is equal or greater to an occupant threshold, and identifying the number of occupants in the area by determining a multiple of the change in thermal intensity values to the level of expected change in thermal intensity values.

Further embodiments disclosed herein include a computer program product including one or more non-transitory machine readable mediums encoding a plurality of instructions that when executed by one or more processors facilitate operation of an electronic device according to a process, the process including receiving a first thermal image of an area at a first time, the first thermal image including a first plurality of thermal intensity values corresponding to a plurality of pixels of a sensor, receiving a second thermal image of the area at a second time after the first time, the second thermal image including a second plurality of thermal intensity values corresponding to the plurality of pixels of the sensor, identifying a change in thermal intensity values between the second plurality of thermal intensity values and the first plurality of thermal intensity values, and determining a change in a number of occupants in the area based on the change in thermal intensity values.

In some embodiments, identifying the change between the second plurality of thermal intensity values and the first plurality of thermal intensity values may include storing the first thermal image and the second thermal image, identifying thermal intensity values in the first thermal image that correspond to one or more thermal intensity values in the second thermal image, and comparing the corresponding thermal intensity values between the first thermal image and the second thermal image to identify the change in thermal intensity values. In some embodiments, the change in thermal intensity values indicates there is no change in the number of occupants in the area based on at least one of the first plurality of thermal intensity values is determined to be equal to the second plurality of thermal intensity values, and the first plurality of thermal intensity values and the second plurality of thermal intensity values are less than a level of expected change in thermal intensity values corresponding to at least one of a single occupant entering the area and a single occupant leaving the area.

In some embodiments, determining a change in the number of occupants in the area may include comparing the change in thermal intensity values to a level of expected change in thermal intensity values corresponding to at least one of a single occupant entering the area and a single occupant leaving the area, determining a rate of change for the change in thermal intensity values, identifying a presence of an occupant in the area when the compared change in thermal intensity values corresponds to one or more occupants and the determined rate of change is equal or greater to an occupant threshold, and identifying the number of occupants in the area by determining a multiple of the change in thermal intensity values to the level of expected change in thermal intensity values. Some embodiments further include associating the change in thermal intensity values with a non-occupant change in response to determining that the determined rate of change is less than the occupant threshold.

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the present disclosure, which is set forth in the following claims.

What is claimed is:

1. A method for determining occupancy of an area, the method comprising:
   receiving a first thermal image of the area collected at a first time, the first thermal image including a first plurality of thermal intensity values corresponding a plurality of pixels of a sensor;
   receiving a second thermal image of the area collected at a second time after the first time, the second thermal image including a second plurality of thermal intensity values corresponding to the plurality of pixels of the sensor;
   identifying a change in thermal intensity values between the second plurality of thermal intensity values and the first plurality of thermal intensity values;
   comparing the change in thermal intensity values to a level of expected change in thermal intensity values corresponding to at least one of a single occupant entering the area and a single occupant leaving the area;
   determining a rate of change for the change in thermal intensity values;
   identifying a presence of an occupant in the area when:
      the compared change in thermal intensity values corresponds to one or more occupants, and
      the determined rate of change is equal or greater to an occupant threshold; and
   identifying the number of occupants in the area by determining a multiple of the change in thermal intensity values to the level of expected change in thermal intensity values.

2. The method of claim 1, wherein the first thermal image is a reference image of the area without occupants.

3. The method of claim 1, wherein identifying the change in thermal intensity values comprises:
   storing the first thermal image and the second thermal image;
   identifying thermal intensity values in the first thermal image that correspond to one or more thermal intensity values in the second thermal image; and
   comparing the corresponding thermal intensity values between the first thermal image and the second thermal image to identify the change in thermal intensity values.

4. The method of claim 1, wherein the change in thermal intensity values indicates there is no change in the number of occupants in the area based on at least one of:
   the first plurality of thermal intensity values is determined to be equal to the second plurality of thermal intensity values; and
   the first plurality of thermal intensity values and the second plurality of thermal intensity values are less than a level of expected change in thermal intensity values corresponding to at least one of a single occupant entering the area and a single occupant leaving the area.

5. The method of claim 1, wherein one or more occupants have entered the area when the change in thermal intensity values is positive.

6. The method of claim 1, wherein one or more occupants have left the area when the change in thermal intensity values is negative.

7. The method of claim 1, further comprising associating the change in thermal intensity values with a non-occupant change in response to determining that the determined rate of change is less than the occupant threshold.

8. The method of claim 1, further comprising adjusting the first plurality of thermal intensity values of the first thermal image, the adjustment preventing an incorrect determination of a change in the number of occupants in the area.

9. The method of claim 8, wherein the first plurality of thermal intensity values of the first thermal image are adjusted such that at least one of the first plurality of thermal intensity values are set to be equal to at least one of the second plurality of thermal intensity values of the second thermal image.

10. A system for detecting one or more occupants within an area, the system comprising:
 a sensor disposed within the area, wherein the sensor is configured to record:
  a first thermal image of the area at a first time, the first thermal image including a first plurality of thermal intensity values corresponding to a plurality of pixels of the sensor; and
  a second thermal image of the area at a second time later than the first time, the second thermal image including a second plurality of thermal intensity values corresponding to the plurality of pixels of the sensor; and
 a computing system in communication with the sensor, wherein the computing system is configured to:
  receive the first thermal image and the second thermal image from the sensor;
  identify a change in thermal intensity values between the second plurality of thermal intensity values and the first plurality of thermal intensity values; and
  compare the change in thermal intensity values to a level of expected change in thermal intensity values corresponding to at least one of a single occupant entering the area and a single occupant leaving the area;
  determine a rate of change for the change in thermal intensity values;
  identify a presence of an occupant in the area when:
   the compared change in thermal intensity values corresponds to one or more occupants, and
   the determined rate of change is equal or greater to an occupant threshold; and
  identify the number of occupants in the area by determining a multiple of the change in thermal intensity values to the level of expected change in thermal intensity values.

11. The system of claim 10, further comprising a network connected to the sensor and the computing system, wherein the sensor is placed in communication with the computing system via the network.

12. The system of claim 10, wherein the computing system is configured to identify the change in thermal intensity values by:
 storing the first thermal image and the second thermal image;
 identifying thermal intensity values in the first thermal image that correspond to one or more thermal intensity values in the second thermal image; and
 comparing the corresponding thermal intensity values between the first thermal image and the second thermal image to identify the change in thermal intensity values.

13. The system of claim 10, wherein the change in thermal intensity values indicates there is no change in the number of occupants in the area based on at least one of:
 the first plurality of thermal intensity values is determined to be equal to the second plurality of thermal intensity values; and
 the first plurality of thermal intensity values and the second plurality of thermal intensity values are less than a level of expected change in thermal intensity values corresponding to at least one of a single occupant entering the area and a single occupant leaving the area.

14. A computer program product comprising one or more non-transitory machine readable mediums encoding a plurality of instructions that when executed by one or more processors facilitate operation of an electronic device according to a process, the process comprising:
 receiving a first thermal image of an area at a first time, the first thermal image comprising a first plurality of thermal intensity values corresponding to a plurality of pixels of the sensor;
 receiving a second thermal image of the area at a second time after the first time, the second thermal image comprising a second plurality of thermal intensity values corresponding to the plurality of pixels of the sensor;
 identifying a change in thermal intensity values between the second plurality of thermal intensity values and the first plurality of thermal intensity values;
 comparing the change in thermal intensity values to a level of expected change in thermal intensity values corresponding to at least one of a single occupant entering the area and a single occupant leaving the area;
 determining a rate of change for the change in thermal intensity values;
 identifying a presence of an occupant in the area when:
  the compared change in thermal intensity values corresponds to one or more occupants, and
  the determined rate of change is equal or greater to an occupant threshold; and
 identifying the number of occupants in the area by determining a multiple of the change in thermal intensity values to the level of expected change in thermal intensity values.

15. The computer program product of claim 14, wherein identifying the change between the second plurality of thermal intensity values and the first plurality of thermal intensity values comprises:
 storing the first thermal image and the second thermal image;
 identifying thermal intensity values in the first thermal image that correspond to one or more thermal intensity values in the second thermal image; and
 comparing the corresponding thermal intensity values between the first thermal image and the second thermal image to identify the change in thermal intensity values.

16. The computer program product of claim 14, wherein the change in thermal intensity values indicates there is no change in the number of occupants in the area based on at least one of:
 the first plurality of thermal intensity values is determined to be equal to the second plurality of thermal intensity values; and
 the first plurality of thermal intensity values and the second plurality of thermal intensity values are less than a level of expected change in thermal intensity values corresponding to at least one of a single occupant entering the area and a single occupant leaving the area.

17. The computer program product of claim 14, further comprising associating the change in thermal intensity values with a non-occupant change in response to determining that the determined rate of change is less than the occupant threshold.

* * * * *